United States Patent
Maffei Vallim et al.

(10) Patent No.: US 11,526,420 B2
(45) Date of Patent: Dec. 13, 2022

(54) TECHNIQUES FOR TRAINING AND DEPLOYING A MODEL BASED FEATURE IN A SOFTWARE APPLICATION

(71) Applicant: Microsoft Technology Licensing, LLC, Redmond, WA (US)

(72) Inventors: Rosane Maria Maffei Vallim, Kirkland, WA (US); Stuart Hillary Schaefer, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 466 days.

(21) Appl. No.: 16/714,285

(22) Filed: Dec. 13, 2019

(65) Prior Publication Data

US 2020/0234188 A1 Jul. 23, 2020

Related U.S. Application Data (60) Provisional application No. 62/795,425, filed on Jan. 22, 2019.

(51) Int. Cl.
G06F 11/36 (2006.01)
G06N 5/04 (2006.01)
G06N 20/00 (2019.01)

(52) U.S. Cl.
CPC ........... G06F 11/36 (2013.01); G06N 5/04 (2013.01); G06N 20/00 (2019.01)

(58) Field of Classification Search
CPC ..... H04L 67/10; H04L 67/34; H04L 41/0816; G06F 11/36; G06F 8/65; G06F 8/76; G06N 5/04; G06N 20/00; G06N 7/005; G06N 3/006; G09G 2320/0626

See application file for complete search history.

(56) References Cited

U.S. PATENT DOCUMENTS

| | | | |
|---|---|---|---|
| 9,405,427 B2 | 8/2016 | Curtis et al. | |
| 11,301,762 B1 * | 4/2022 | Chen | G06N 5/027 |
| 2016/0148115 A1 | 5/2016 | Sirosh et al. | |
| 2018/0330278 A1 | 11/2018 | Ghajar et al. | |

(Continued)

FOREIGN PATENT DOCUMENTS

| | | |
|---|---|---|
| WO | 2018111270 A1 | 6/2018 |
| WO | 2019003485 A1 | 1/2019 |
| WO | 2019014101 A1 | 1/2019 |

OTHER PUBLICATIONS

Kim, et al."Reinforcement Learning-Based Dynamic Adaptation Planning Method for Architecture-based Self-Managed Software", In Proceedings of ICSE Workshop on Software Engineering for Adaptive and Self-Managing Systems, Mar. 18, 2009,pp. 76-85.

(Continued)

*Primary Examiner* — El Hadji M Sall
(74) *Attorney, Agent, or Firm* — ArentFox Schiff LLP (57) ABSTRACT

Examples described herein generally relate to deploying, on multiple separate devices, an instance of an application having a baseline version of a model for executing in a real-world context, receiving, from each instance of the application, interaction data from the application based on using the model to perform inferences during execution of the instance of the application, and training, based on the interaction data, the model to generate a trained version of the model for performing subsequent inferences during execution of the application.

20 Claims, 5 Drawing Sheets

(56) References Cited

U.S. PATENT DOCUMENTS

| | | |
|---|---|---|
| 2018/0349103 A1 | 12/2018 | Brown et al. |
| 2018/0349114 A1 | 12/2018 | Brown et al. |
| 2020/0004595 A1* | 1/2020 | Sengupta .................. G06T 1/20 |
| 2020/0004596 A1* | 1/2020 | Sengupta .................. G06N 5/04 |
| 2020/0004597 A1* | 1/2020 | Sengupta ............. G06F 9/5044 |
| 2020/0005124 A1* | 1/2020 | Sengupta ................ G06N 3/08 |
| 2021/0173661 A1* | 6/2021 | Cheng .................... G06N 20/00 |

OTHER PUBLICATIONS

Zhang, DU"Applying Machine Learning Algorithms in Software Development", In Proceedings of the Monterey Workshop on modeling Software System Structures in a Fastly Moving Scenario, Jun. 13, 2000,pp. 275-285.

Feng, et al., "Learning to Collaborate: Multi-Scenario Ranking via Multi-Agent Reinforcement Learning", In Journal of Computing Research Repository., Sep. 17, 2018, 10 Pages.

"International Search Report and Written Opinion Issued in PCT Application No. PCT/US20/013761", dated May 4, 2020, 13 Pages.

\* cited by examiner

TECHNIQUES FOR TRAINING AND DEPLOYING A MODEL BASED FEATURE IN A SOFTWARE APPLICATION

CLAIM OF PRIORITY UNDER 35 U.S.C. § 119

The present Application for Patent claims priority to Provisional Application No. 62/795,425, entitled "TECHNIQUES FOR TRAINING AND DEPLOYING A MACHINE LEARNING BASED FEATURE IN A SOFTWARE APPLICATION" filed Jan. 22, 2019, which is assigned to the assignee hereof and hereby expressly incorporated by reference herein for all purposes.

BACKGROUND

Use of computing devices is becoming more ubiquitous by the day. Computing devices range from standard desktop computers to wearable computing technology and beyond. One area of computing devices that has grown in recent years is in the context of machine learning (ML). ML typically involves generating a model that is trained offline to provide some output based on one or more received inputs. The model is trained to achieve one or more goals for providing the output. In some instances, the goal can include simple optimization where ML can observe which values for a set of input parameters result in a most optimal output, and can accordingly train the model. In reinforcement learning (RL), agents, or software applications, interact with an environment over multiple iterations, and autonomously update their decision policies based on reward signals. For example, when new data is received, parameter values can be changed and explored (e.g., guesses for values can be made) to optimize potential for better rewards in the future.

Presently, RL models are trained offline using a simulator and/or randomly selected input/output data. The offline-trained models can be obtained (e.g., as downloaded from a source or as generated by execution of a simulator) and deployed in software applications prior to installation/execution of the software applications on other devices. RL frameworks are built in such a way that a developer sets up the learning agent in an artificial simulated environment and lets the agent run for long periods of time until a quality criteria is met. After the agent has completed the training process, the developer can freeze the ML model and deploy to the application domain for performing inferences during runtime.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

In an example, a computer-implemented method for training a model is provided. The method includes deploying, on multiple separate devices, an instance of an application having a baseline version of a model for executing in a real-world context, receiving, by a development environment for developing the application and from each instance of the application, interaction data from the application based on using the model to perform inferences during execution of the instance of the application, training, by the development environment and based on the interaction data, the model to generate a trained version of the model for performing subsequent inferences during execution of the application, and generating, by the development environment, an updated instance of the application including the trained version of the model.

In another example, a computing device for training a model is provided. The computing device includes a memory storing one or more parameters or instructions for developing an application, and at least one processor coupled to the memory. The at least one processor is configured to deploy, on multiple separate devices, an instance of an application having a baseline version of a model for executing in a real-world context, receive, by a development environment for developing the application and from each instance of the application, interaction data from the application based on using the model to perform inferences during execution of the instance of the application, train, by the development environment and based on the interaction data, the model to generate a trained version of the model for performing subsequent inferences during execution of the application, and generate, by the development environment, an updated instance of the application including the trained version of the model.

In another example, a computer-readable medium including code executable by one or more processors for training a model is provided. The code includes code for deploying, on multiple separate devices, an instance of an application having a baseline version of a model for executing in a real-world context, receiving, by a development environment for developing the application and from each instance of the application, interaction data from the application based on using the model to perform inferences during execution of the instance of the application, training, by the development environment and based on the interaction data, the model to generate a trained version of the model for performing subsequent inferences during execution of the application, and generating, by the development environment, an updated instance of the application including the trained version of the model.

To the accomplishment of the foregoing and related ends, the one or more examples comprise the features hereinafter fully described and particularly pointed out in the claims. The following description and the annexed drawings set forth in detail certain illustrative features of the one or more examples. These features are indicative, however, of but a few of the various ways in which the principles of various examples may be employed, and this description is intended to include all such examples and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various examples related to generating and deploying model-based features in software applications. In particular, a baseline model can be generated and deployed with the software applications during the development process. As the software applications (also referred to as "agents") are executed on different devices, the associated baseline models can change by using artificial intelligence, such as machine learning (ML), reinforcement learning (RL), etc., to adjust or derive certain parameters. The learning portion of the software applications that control use of the model(s) can be referred to herein as "agents," where the software applications control interaction with the environment and decide how to use the learning "agents." Each agent can change independently due to various consideration, such as an operating environment, usage patterns for the corresponding software applications, and/or the like, resulting in varying values for the certain parameters. These changes can be obtained in the development environment where the agents can be configured to report the changes (e.g., periodically, on-demand from the development environment, etc.). This can be used to train a model and integrate the changes such to model structure and parameterization based on real interaction data coming from the software applications. The trained model can be deployed as part of further development for the software application and/or as the trained model for use by a deployed version of the software application. Though the terms "ML" and "ML model" are used and described throughout, the concepts described herein can be similarly applied to substantially any sort of model that can be developed and/or refined using substantially any sort of artificial intelligence-based function (e.g., ML, RL, etc.).

Reinforcement learning can relate to using a ML model to determine one or more outputs based on one or more inputs, and receiving positive (e.g., reward) feedback or negative (e.g., punishment) feedback for decisions made. For example, a reinforcement learning process can guess at, or estimate, certain parameters to generate the output(s), and can determine whether the guessing or estimating is proper based on the feedback. The feedback may be received from a user of a device whose application enacts function(s) based one or more outputs of the ML model provided to the user and provides a way to collect the reward signal. The reinforcement learning process can continue adjusting how it makes decisions about a given problem based on the feedback from the user(s) in order to make better decisions over time (e.g., more desirable decisions based on the received reward and/or punishment feedback). Because of the desire for a sufficiently large body of data to train the ML model using reinforcement learning in this regard and hence a significant amount of time, it is may be desirable but often complex to bootstrap the ML model with the application for first-time use.

In bootstrapping the ML model, conventional systems use either a cold-start approach where an initial decision model can be created with random weights, a simulation-based approach where a simulator can be built to mimic the application environment in which the model is to be deployed during which the ML model is trained using reinforcement learning, or a traditional machine learning approach is used to create early generations of the ML model. In the last example, a ML model can be built offline using supervised machine learning techniques, which requires data previously collected from users interacting with the application to be labeled in order to train the model. The cold-start approach can be inefficient in that it can make unacceptable decisions and extend the time necessary to learn good decisions from user feedback. The simulation approach may be expensive and time consuming to build and execute the simulator, and the simulator may only be an approximation of the real-world scenario leading to high error rates in initial deployments. The offline supervised machine learning approach most often requires labeling of data examples and may require special knowledge of a data scientist to build the initial model from the labeled data set.

Accordingly, aspects described herein relate to a different way to bootstrap decision models that may allow a developer to integrate a ML model with little knowledge on ML techniques or the model itself. This can be achieved at least in part by integrating aspects of reinforcement learning, imitation learning, and/or automated machine learning during an iterative application and machine learning co-development process, as described further herein. For example, a baseline ML model can be deployed in an instance of an application for collecting interaction data from various different users, machines, environments, etc. The interaction data can include reward and/or punishment feedback used in reinforcement learning, which can be received by the development environment for the application and used to train the ML model for subsequent releases. The baseline ML model may be generated using existing code to provide inputs/outputs by which to generate the ML model and/or by using randomized inputs, as described further herein.

Figure 1:
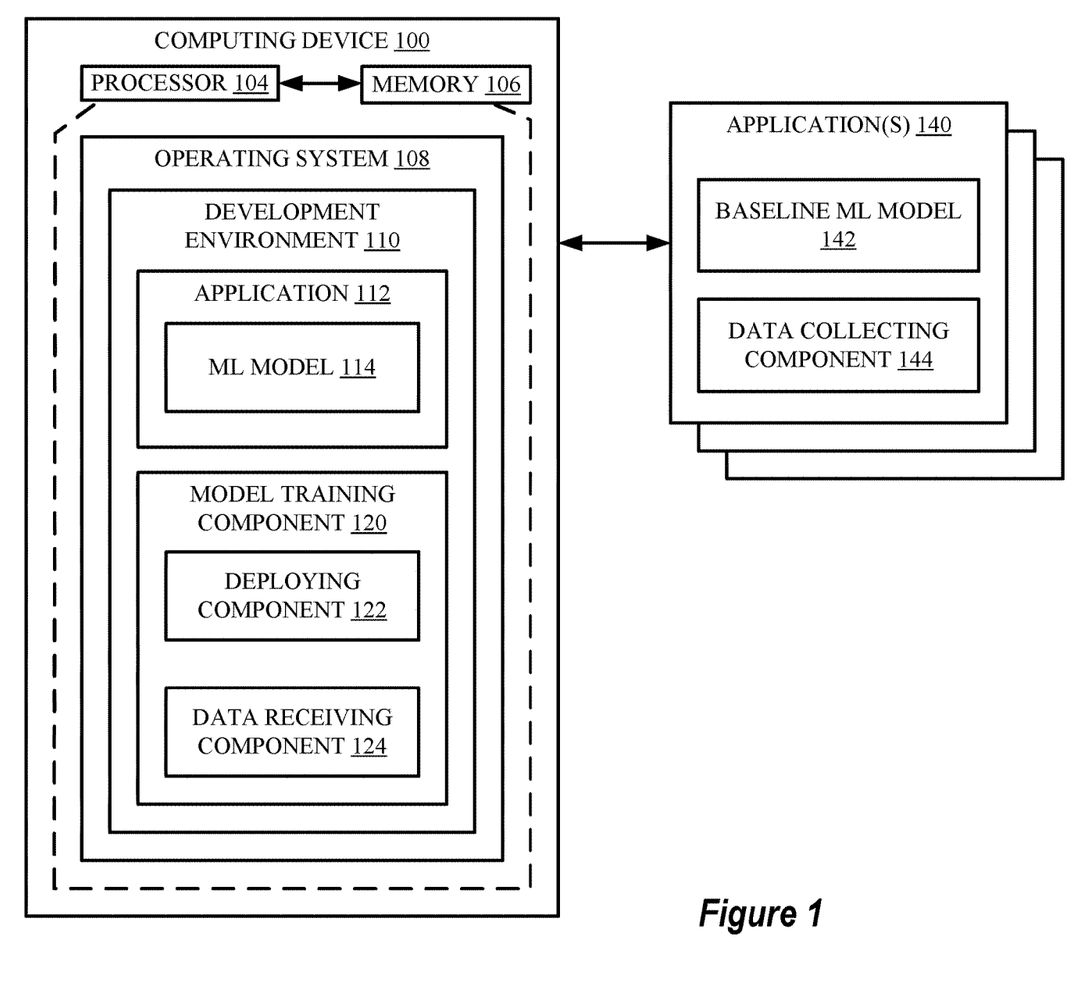
FIG. 1 is a schematic diagram of an example of a computing device for developing and training a machine learning model in accordance with examples described herein.
Figure 2:
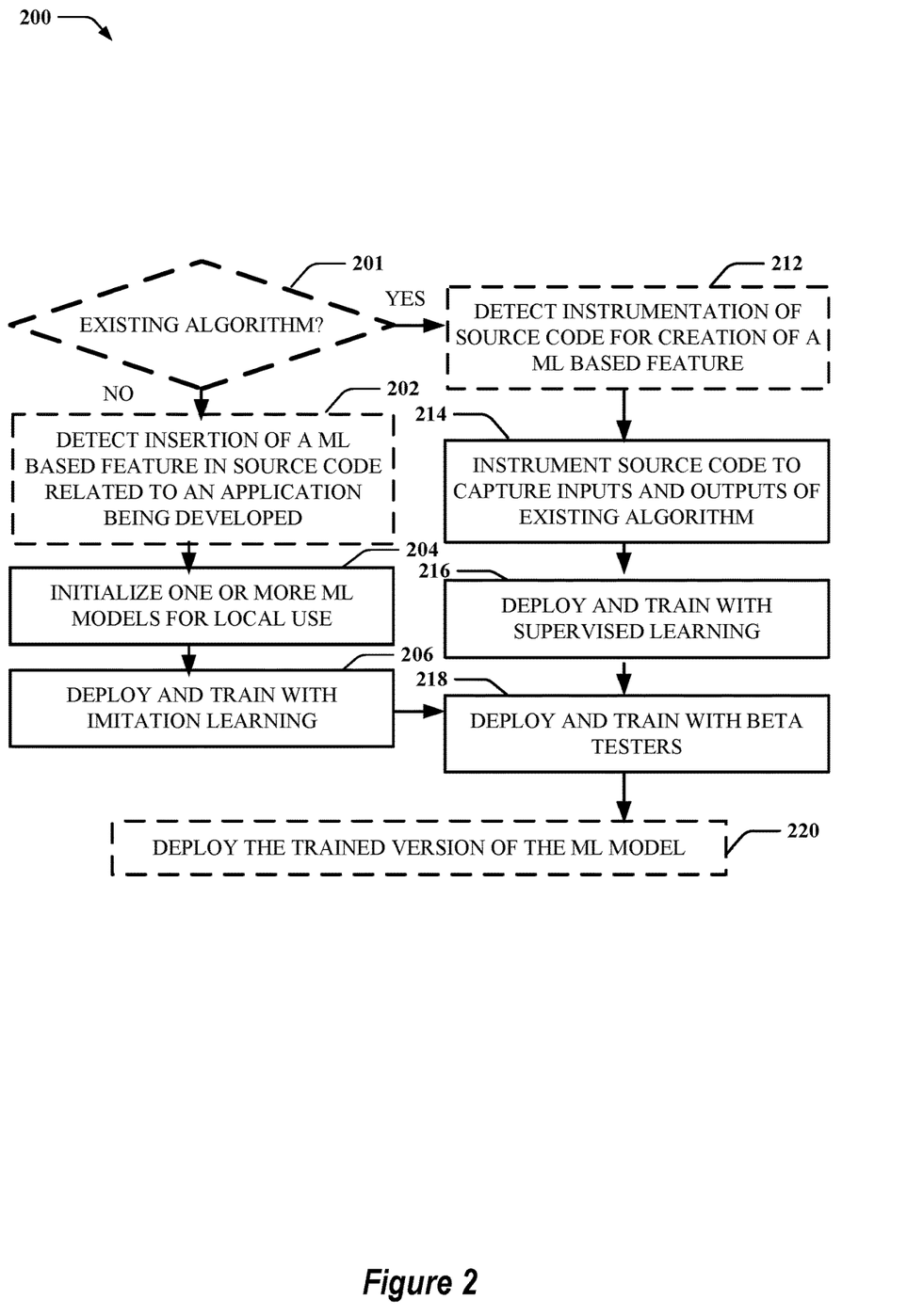
FIG. 2 is a flow diagram of an example of initializing and deploying a machine learning model in accordance with examples described herein.
Figure 3:
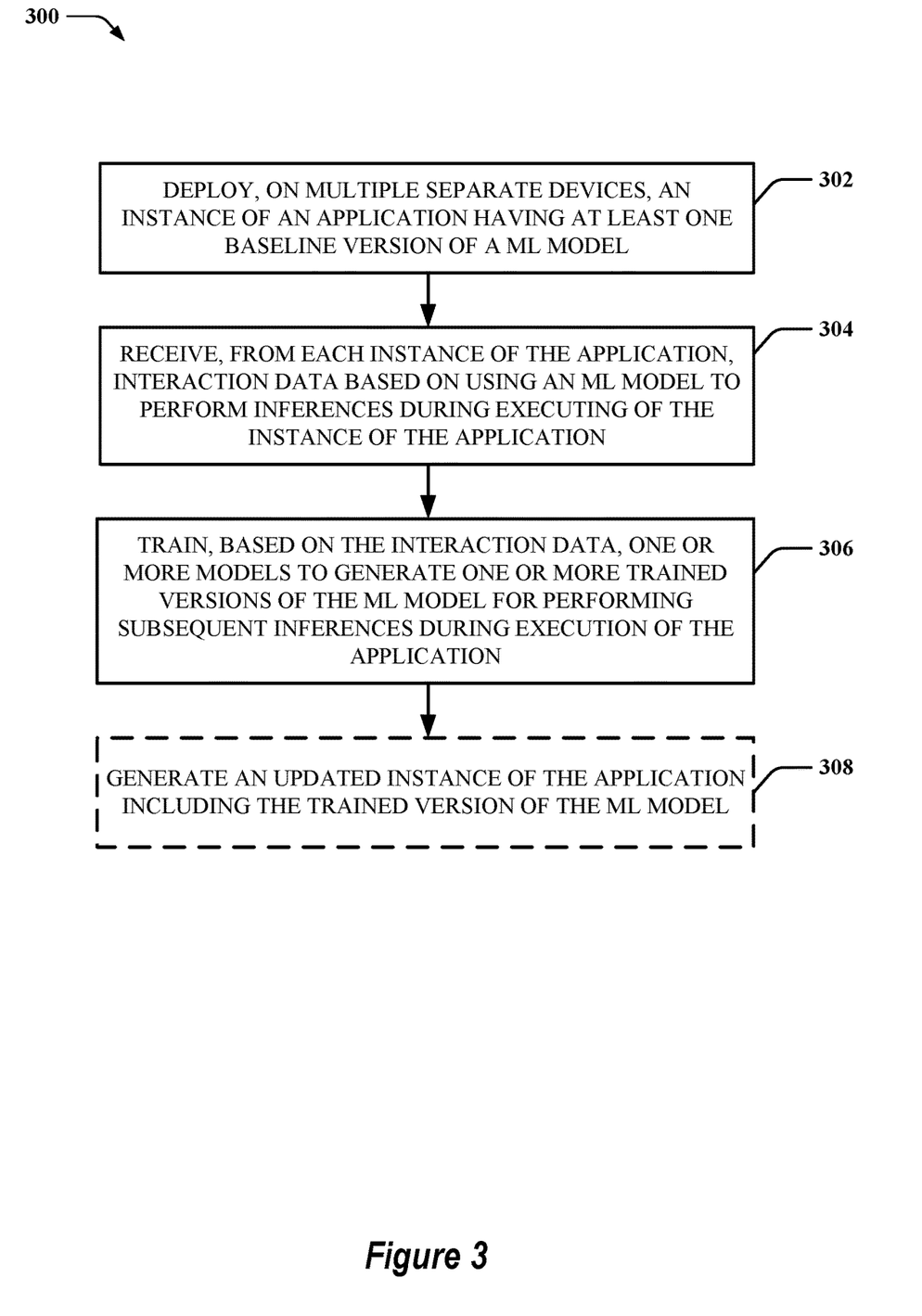
FIG. 3 is a flow diagram of an example of deploying and training a machine learning model in accordance with examples described herein.

Turning now to FIGS. 1-5, examples are depicted with reference to one or more components and one or more methods that may perform the actions or operations described herein, where components and/or actions/operations in dashed line may be optional. Although the operations described below in FIGS. 2-3 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a computing device 100 and/or related components for training and deploying a ML model in accordance with aspects described herein. For example, computing device 100 can include or can otherwise be coupled with a processor 104 and/or memory 106, where the processor 104 and/or memory 106 can be configured to execute or store instructions or other parameters related to training and/or deploying a ML model for use in developing a software application, as described herein. Computing device 100 can execute an operating system 108 (e.g., via processor 104 and/or memory 106) for providing an environment for executing one or more applications. The operating system 108 can execute a development environment 110 that can be used to develop a software application, such as application 112, for executing on one or more devices. For example, the application 112 can be written by a developer using a programming language, and the development environment 110 can allow for compiling instructions written by the developer into machine language, which can then be linked based on a desired operating environment for the application and used to generate an executable for execution in the desired operating environment. In this regard, the application 112 can be deployed to various different devices for execution to provide functionality intended by the developer.

In an example, the application 112 can include a ML model 114 used to accept a set of input parameter values and generate some corresponding functionality or output for the application 112. The ML model 114 can be trained using a ML process, such as reinforcement learning (e.g., and/or the process described herein), to determine, based on a set of input parameter values, the functionality or output to perform as part of the application 112. For example, the ML model 114 can be trained based on a reward/punishment system where some parameters may be estimated in an attempt to determine which estimations result in rewards (and/or the highest reward) for training the model. Conventionally, the ML model 114 is trained offline and/or by using a simulator to determine the desirable output/functionalities based on input parameterization. The trained ML model can be deployed in the application 112, and the application 112 can be deployed, with the trained ML model to other devices for execution based on the trained ML model.

Aspects described herein relate to training the ML model 114 as part of deploying and/or executing the application 112 on other devices. Thus, deploying the application 112 and accordingly training the model 114 can be part of the development process. In this regard, development environment 110 can include a model training component 120 for training the ML model 114. For example, model training component 120 can include a deploying component 122 for deploying a version of the ML model 114 (or otherwise preparing the ML model 114 for deployment) with the application 112 to one or more other devices for performing machine learning using data from the one or more other devices, and a data receiving component 124 for receiving interaction data from the one or more other devices, where the interaction data may indicate input data from the one or more other devices using the application 112, associated output data based on the input data, feedback regarding operation of the application 112 based on the input and/or corresponding output data, reward/punishment information that may be correlated with the feedback, etc. Model training component 120 can use the interaction data from the one or more other devices to train the ML model 114, as described herein.

In an example, the application 112 can be deployed as one or more different instances of the application 140 on one or more different devices or operating environments. Application(s) 140 can be deployed with a baseline ML model 142, which is a baseline version of ML model 114. The baseline ML model 142 can have associated baseline ML for determining outputs and/or corresponding functions to perform for a set of inputs based on baseline ML functionality, which can be defined using the development environment 110 and can be defined by the developer or otherwise using default parameterization or logic provided by the development environment 110. As described further herein, the baseline ML model 142 may be generated based on one or more of instrumenting existing code of the application 112 to output data related to inputs and outputs of the existing code to be replaced by the ML model, or by randomizing inputs to generate corresponding outputs of the baseline ML model 142. Application(s) can also include a data collecting component 144 for collecting interaction data for the application 140 to use in training the ML model 114. For example, the instances of application 140 and/or the corresponding baseline ML model 142 can be executed and data collecting component 144 can collect certain interaction data, which can include input parameter values set by a user of the application(s) 140 or otherwise determined for the application(s) 140, and/or can include calculated outputs, corresponding reward and/or punishment values in reinforcement learning, and/or the like.

In any case, data collecting component 144 can provide the collected interaction data to the model training component 120 for training (e.g., updating via training) the ML model 114. Model training component 120 can receive and/or can process the collected data (e.g., in a local debugging session for the application 112 within development environment 110) in order to train the ML model 114 to a trained version. The trained version of the ML model 114 can be deployed as a next ML model (e.g., a next "baseline" ML model 142 for further development of the ML model) and/or as the deployed model for use by instances of the application 112 deployed in a release environment (e.g., as released software that may not collect interaction data for further ML model development).

FIG. 2 is a flowchart of an example of a method 200 for deploying and training a ML model for use in developing a software application. For example, method 200 can be performed by the computing device 100, and is accordingly described with reference to FIG. 1, as a non-limiting example of an environment for carrying out method 200.

For method 200 two cases can be considered: one where an application 112 already has an existing algorithm which implements a feature whose code (or at least a portion thereof) is to be replaced by a ML model; and an alternate case where a new feature of the application 112 is to be built based on a ML model. Thus, in method 200, at action 201, it can be determined whether there is an existing algorithm that implements a feature whose code is to be replaced by the ML model. In an example, development environment 110, e.g., in conjunction with processor 104, memory 106, etc., can determine whether there is the existing algorithm related to the ML model to be added to the application 112. For example, development environment 110 may include an option to insert an ML model, and determining whether there is the existing algorithm can include determining where, in the source code for the application 112, the ML model is to be inserted. For example, this can include a location selected by the developer within application source code or another representation of the application 112 being developed, an option selected via the developer interface (e.g., to insert an ML model or build a function around or based on an ML model), etc. In one example, however, this determination may be optional, and whether the algorithm is existing may be based on whether insertion of an ML feature is detected at action 202 and/or whether instrumentation of source code is detected at action 212.

In method 200, optionally at action 202 or 212, insertion of a ML model in source code related to an application being developed, or instrumentation of source code for creation of a ML based feature, can be detected. In an example, development environment 110, e.g., in conjunction with processor 104, memory 106, etc., can one or more of detect insertion of the ML model 114 in source code related to the application being developed or detect instrumentation of source code for creation of the ML based feature. In one example, the detection at action 202 or 212 may drive the determination of whether there is an existing algorithm, as described above. For example, development environment 110 may include a graphical user interface (GUI) for creating source code for an application, compiling the source code, linking the compiled code into an executable application, executing the application, step-through debugging the application, etc. The GUI can also include an option for inserting a ML model in source code that defines certain parameterization and can learn, via ML, parameter values that achieve a certain goal, output, function, etc. In an example, the development environment 110 may detect the ML model 114 in the source code upon insertion, as part of compiling the source code or a pre-compiling step, etc., and can accordingly perform one or more actions to associate the ML model 114 with the application 112.

In an example, a developer using the development environment 110 can build a feature that may ultimately be responsible for making decisions, based on a set of possible choices, on what to do next. In other words, given a set of one or more inputs, the feature may generate one or more outputs of data and/or functionality based on logic used to provide the feature. In this regard, for example, code can be inserted in the application 112 (e.g., based on developer input via the development environment) that can use reinforcement learning to one or more of: a) drive decision-making given a set of one or more inputs coming from the application; b) observe the result of the decision along with an estimate of how good the choice was (e.g., based on interaction data in the form of reward or punishment feedback); and/or c) use the decision and the result (observed reward) to initiate retraining of one or more underlying ML models 114 responsible for making decisions (e.g., updating the ML model 114 with the latest information), as described herein. In one example, the existing feature of the application 112 may eventually be replaced with the ML model 114. In either case, based on detecting insertion of the ML based feature or instrumentation of source code, a baseline ML model can be created for deploying to one or more machines for training the ML model via reinforcement learning.

In one example, to bootstrap the initial version of the underlying baseline ML model 142, existing procedural code based on a previous version of the application 140 can be used as a source of training. The insertion of instrumentation into application 140 can be detected by action 212, as described, and at action 214, source code can be instrumented to capture inputs and outputs of the existing algorithm. In an example, development environment 110, e.g., in conjunction with processor 104, memory 106, etc., can instrument (or otherwise cause or facilitate instrumentation of) source code to capture inputs and output of the existing algorithm. For example, the development environment 110 can display prompts to guide the developer through capturing inputs and associated decisions being made by the existing function as a proxy for the ML model 142, and may accordingly instrument the source code of the application 112. For example, the instrumented code may be similar to the following:

```
DecisionOutputs ExistingDecisionFunction(DecisionInputs inputs)
{
    // Run the existing algorithm for decision selection
    DecisionOutputs outputs;
    ...
    return outputs;
}
int runId = GenerateRunIdentifier( );
TraceFunction(runId, "INPUTS", inputs);
outputs = ExistingDecisionFunction(inputs);
TraceFunction(runId, "OUTPUTS", outputs);
ApplyDecision(outputs);
```

In this example, the application 140 (as an instance of application 112) can then be deployed and the baseline ML model 142 can be trained with supervised learning, at action 216. In an example, development environment 110, e.g., in conjunction with processor 104, memory 106, etc., can deploy the application and train with supervised learning. For example, this can include invoking method 300, which is described below in reference to FIG. 3, within a local testing or fighting environment and/or to end customers, from which output from the instrumented code and/or interaction data (e.g., reward/punishment feedback) can be received, as described further herein. For example, development environment 110 can deploy the application on various devices for executing the instrumented application to provide inputs/outputs of the existing code that can be used to initialize the baseline ML model via supervised learning.

In another example, where existing procedural code does not exist, action 202 insertion of a new ML model based feature into the source code of the application 112 being developed can be detected. In this example, to bootstrap the initial version of a baseline ML model 142 in action 204, one or more ML models can be initialized (e.g., for local use or otherwise). In an example, development environment 110, e.g., in conjunction with processor 104, memory 106, etc., can initialize the one or more ML models for local use. For example, a ML model structure fitting the dimensionality of the inputs and/or outputs can be used as well as initial weights for the ML model, which can be chosen at random, as described above. At action 206, the application can be deployed and trained with imitation learning. In an example, development environment 110, e.g., in conjunction with processor 104, memory 106, etc., can deploy the application (e.g., application 140 with the baseline ML model 142) for training with imitation learning. This can include deploying the application 140 to a local workstation environment where the application developer can interact with the application and their initial usage used as direct training data. In this example, model training component 120 can be configured to use imitation learning to directly mimic or fit the actions of the application developer, and can report corresponding output to the development environment 110 for training the ML model 114. When the structure and initial testing of the new feature is complete (e.g., as indicated by the developer via development environment or otherwise), the application 140 can be deployed to an internal testing environment where beta-testers can use the application 140 as an end-customer may use the application 140.

In either example, whether the existing code is used to initialize the baseline ML model or whether randomized inputs are used, method 200 may include, at action 218, deploying and training with beta testers. In an example, development environment 110, e.g., in conjunction with processor 104, memory 106, etc., can deploy the application for training with beta-testers. In this example, the application 140 can make decisions based on the baseline ML model 142 and can collect corresponding interaction data from the beta-testers (e.g., via reward/punishment feedback specified for decisions made by the baseline ML model 142 to perform training thereof via reinforcement learning). An example, of deploying the baseline ML model, which can be implemented for action 218, is illustrated and described in FIG. 3.

FIG. 3 is a flowchart of an example of a method 300 for deploying and training a ML model for use in developing a software application. For example, method 300 can be performed by the computing device 100, and is accordingly described with reference to FIG. 1, as a non-limiting example of an environment for carrying out method 300.

Method 300, for example, may be used for deploying the baseline version of the ML model 114 (and/or a trained version) for collecting interaction data and training (or further training) the ML model 114. In method 300, at action 302, an instance of an application having at least one baseline version of a ML model can be deployed on multiple separate devices. In an example, deploying component 122, e.g., in conjunction with processor 104, memory 106, development environment 110, model training component 120, etc., can deploy, on the multiple separate devices, the instance of the application 112 having the baseline version of the ML model 114. For example, deploying component 122 may generate the baseline version of the ML model 114, which can be generated using supervised learning based on inputs/outputs gathered from existing code based on instrumenting the code to output the input/output data, generated from randomized inputs and/or using imitation learning, and/or the like, as described. Deploying component 122 can deploy the baseline version of the ML model 114, or can otherwise prepare the baseline version of the ML model 114 for deployment, with application 112. In an example, as part of deploying the baseline version of the ML model 114, compiling the application 112, etc., deploying component 122 can insert, e.g., within the source code for the application 112, instructions or code for collecting interaction data when an instance of the application interacts with the model or data related to the mode, where the interaction data can be subsequently used for further ML model training. In another example, the baseline version of the model can be a previously-trained ML model, whether trained using previous deployments as those described herein, imitation learning, supervised learning, etc.

Deploying component 122 can deploy the instances of the application 112 as separate applications 140 executing on one or more other devices or environments. Thus, as described, the instances of the application(s) 140 can include the same or similar baseline ML model 142 when deployed, and the application(s) 140 can each separately interact with the baseline ML model 142 causing production of different interaction data based on the environment within which the application(s) 140 execute, different usage patterns of the application(s) 140, etc. As described, data collecting component 144 can collect this interaction data at each instance of the application(s) 140 for providing back to the model training component 120 for further training the ML model 114. Thus, usage of the application 140 with baseline ML model 142 can be used to train the ML model 114.

For simplicity, in an example, the ML model can be considered to be applied as a function to follow a simple mathematical form $y=f(x)$, where the decision is the set of outputs, y, calculated from operations on the inputs, x. This can be a function call, in one example:

```
DecisionOutputs DecisionFunction(DecisionInputs inputs)
{
    DecisionOutputs outputs = EvaluateMachineLearningModel(inputs);
    return outputs;
}
```

In method 300, at action 304, interaction data can be received, from each instance of the application, based on using the ML model to perform inferences during executing of the instance of the application. In an example, data receiving component 124, e.g., in conjunction with processor 104, memory 106, development environment 110, model training component 120, etc., can receive, from each instance of the application (e.g., each of application(s) 140), interaction data based on using the ML model (e.g., the baseline model 142) to perform inferences during executing of the instance of the application. In an example, this can include observing the actions of use of the application and accompanying rewards and/or punishments. For example, deploying component 122 can insert callback functions, hooks, or other programming functions, within the source code to cause the instances of the application(s) 140 to collect and/or report the interaction data (e.g., as reward/punishment feedback, which can be generated by a user for inferences made by the ML model) via data collecting component 144. In another example, model training component 120 can periodically request the interaction data from the application(s) 140, and/or the like.

In an example, where existing procedural code is used to bootstrap the initial version of the underlying baseline ML model 142, the interaction data can be obtained using the procedural code to record the data. Where the baseline ML model 142 is deployed for modeling beta-testers, the interaction data can be collected as the baseline ML model 142 makes decisions based on beta-tester usage.

In method 300, at action 306, the ML model can be trained, based on the interaction data, to generate one or more trained versions of the ML model for performing subsequent inferences during execution of the application. In an example, model training component 120, e.g., in conjunction with processor 104, memory 106, development environment 110, etc., can train, based on the interaction data, the ML model to generate the one or more trained versions of the ML model 114 for performing subsequent inferences during execution of the application. In an example, model training component 120 may determine to train the ML model 114 once a sufficient amount of data is received from existing procedure code, after a specific period of time, as interaction data is received from one or more instances of the application, etc. For example, model training component 120 can train the ML model 114 using reinforcement learning based on the interaction data (which may specify reward/punishment feedback, as described).

For example, model training component 120 can train the ML model 114 using reinforcement learning based on the data received from data collecting component(s) 144 in the application(s) 140. In one example, model training component 120 can train the ML model 114 as part of a local debugging process performed (e.g., in the development environment) for the application. In an example, model training component 120 can train the ML model 114 at a time subsequent to deploying the baseline ML model 142 with the application(s) 140, such to allow collection of an amount of interaction data that may facilitate training of the ML model 114. In this example, model training component 120 may train the ML model 114 in offline training using supervised machine learning against the interaction data received from the procedural code. For example, model training component 120 may train the ML model 114 using an adaptive model search, hyperparameter sweep, and/or the like.

Where the baseline ML model 142 is deployed to beta-testers, model training component 120 can train the ML model 114 based on one or more resulting baseline models 142 that are trained based on beta-tester usage. For example, the developer can select a most desirable over the trained baseline models 142, aggregate baseline ML models 142 from multiple applications, 140, and/or the like. In any case, model training component 120 can train the ML model 114 based on the received interaction data to generate the trained version of the ML model as a next baseline for further training and/or as a trained model for releasing with the application in a release context (e.g., without a version of the application and/or model that reports interaction data back to the model training component 120).

In method 300, optionally at action 308, an updated instance of the application including the trained version of the ML model can be generated. In an example, deploying component 122, e.g., in conjunction with processor 104, memory 106, development environment 110, model training component 120, etc., can generate the updated instance of the application including the trained version of the model. For example, deploying component 122 can generate the updated instance of the application 112 for further training and can accordingly deploy instances of the application, as application(s) 140, and can collect interaction data for further updating the ML model, as described above. In another example, deploying component 122 can generate the updated instance of the application 112 for deploying as a release version of the application 112 to be used without necessarily reporting interaction data.

Additionally, referring back to FIG. 2, in method 200, optionally at action 220, the trained version of the ML model can be deployed. In an example, deploying component 122, e.g., in conjunction with processor 104, memory 106, development environment 110, model training component 120, etc., can deploy the trained version of the ML model. As described, deploying component 122 can deploy the trained version of the ML model 114 as another baseline version of the ML model 142 for application(s) 140, or as a release version of the ML model for including in a release version of application 112 that may be compiled and/or built without the callback instructions to the model training component 120 described above. This may include deploying the trained model to the application(s) 140 using an automated update for instances of the application(s) 140 and/or may include deploying the trained model in a release candidate build for the application 112, etc. In an example, deploying the trained version of the ML model at action 220 and/or generating the updated instance of the application at action 308 may be based on a determination that the developer and/or testers are confident in the baseline ML model 142 ability to make correct decisions (which can be indicated via an interface of the development environment 110 to obtain the current interaction data, and/or the like).

Figure 4:
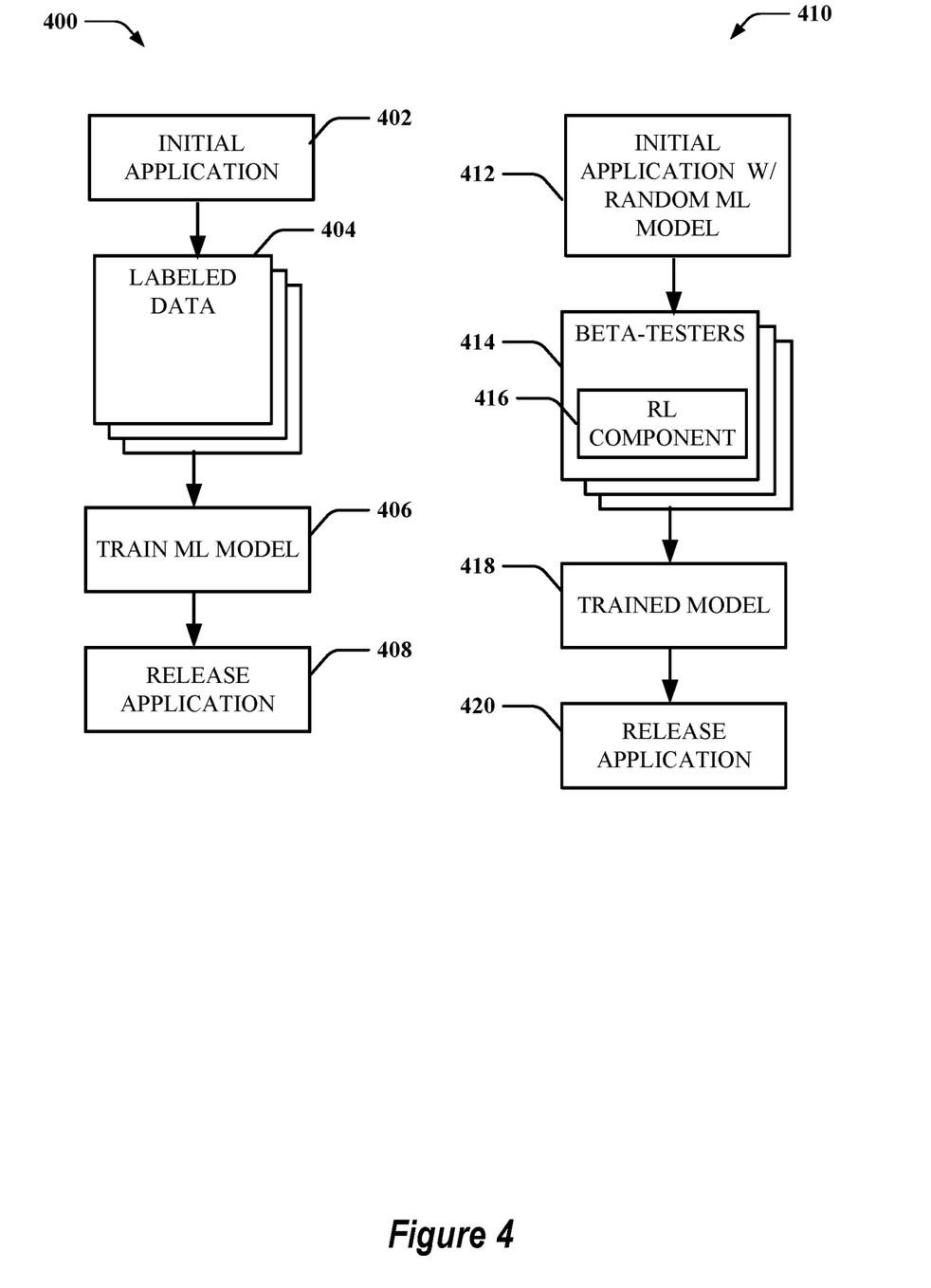
FIG. 4 is a schematic diagram of examples of systems for training a machine learning model for performing functions described herein.

FIG. 4 illustrates a specific example of a system 400 for using procedural code to bootstrap the initial version of the baseline ML model 142. System 400 includes an initial application 402, which can be similar to application 112 and can include procedural code for collecting interaction data, as described. Thus, initial application 402 can be deployed with a baseline ML model 114 having the procedural code. For example, the existing code of the application 112 can be instrumented with the procedural code, as described above. The application 402 can store, via the procedural code, labeled data 404 generated in making decisions via the baseline ML model 142 and/or reinforcement information for decisions made (e.g., reward and punishment data). The labeled data 404 can be used to train the ML model 406 to generate a new ML model 114 for providing in release application 408. For example, given procedural code for solving a problem (e.g., a feature as described herein), the code can be instrumented to provide the inputs and outputs of the code, and the pairs or sets pf inputs/outputs can be used as examples to train a ML algorithm using Supervised Learning techniques.

The trained ML model 114 can make better decisions than the previous baseline ML model 142 based on training using the procedural data. This may be advantageous when the developer already has existing code that is determined to be desirable, but can improve by leveraging reinforcement learning to continuously learn from interactions and usage, instead of relying on the same fixed behavior over and over again. This option can better serve a developer who has some initial ML knowledge (such that he can train the initial ML model), or has access to data scientist for training the initial ML model. In this example, beta-testers and reinforcement learning, as described below, can additionally be used to record a reward signal on whether decision based on the trained model are desirable or not. This can drive model retraining with the goal of producing a newer version of the model that is even better at making decisions.

FIG. 4 also illustrates a specific example of a system 410 for deploying the baseline ML model 142 to beta-testers. System 410 includes an initial application 412 with a random ML model, which can be similar to application 112 and can include a baseline ML model 142 trained using random weights decisions, as described. The initial application can be deployed to beta-testers 414 and can include a reinforcement learning (RL) component 416 for obtaining reward/punishment feedback (e.g., from the beta-testers and based on inferences made by the ML model during the course of execution over a period of time) and performing RL to make decisions based on reward/punishment feedback provided by the beta-testers. In one specific example, the developer may be able to write mathematical functions that describe the amount of reward to provide to the RL mechanism. For example, based on the input to the model and the output generated, the developer may write a function that takes those as inputs and calculates a reward number. The reward function may be dependent on application context, so the developer may specify a function that makes sense in the context of his/her application. Passing that information to the learning system can be enabled via RL application programming interfaces (APIs) provided by the RL component 416 to generate and utilize reinforcement learning to train the model, as described herein.

In any case, the RL components 416 trained by usage of one or more beta-testers can be used (e.g., and/or an aggregate of various RL components 416) as trained model 418, which can be deployed in release application 420, as described. This can be advantageous for developers who have no ML knowledge and/or no previous code that solves the problem to some extent. In either deployment, once the developer is satisfied with the quality of the ML model 114, the ML model 114 can be deployed within the application 112 code. In addition, for example, the RL components 416 inside the application code can continue to use application instrumentation data to continuously perform retraining loops for the ML model 114, as described in one example, using the latest data from the user interaction, in order to dynamically update the ML model 114.

In another specific example, the ML model 114 can correspond to selecting a screen brightness policy for a given device executing the instance of the application 140 based on a set of input parameter values. The baseline ML model 142 can be set to include a baseline parameterization of parameters for selecting a brightness profile based on one or more input parameters such as the amount of current ambient light, length of time the computing device 100 has been powered on, the current average pixel brightness of what is displayed on screen and/or whether it is running on AC power or battery or alternate aspects of the device's active power policy. In an example, development environment 110 can obtain the baseline version of the ML model 142, or related parameters for generating the model, as specified by a developer, from a machine learning source for such baseline models, etc., for determining which brightness profile to select based on the input parameter values. In addition, in this example, the model training component 120 can provide the application(s) 140 with callback functionality or other functions to report interaction data with the application 140, as described, for determining, using reinforcement learning, which brightness profiles to select given certain input parameters. Model training component 120 can train the model, over a period of time, based on the received interaction data, as described, where the received interaction data can be associated with certain values of input parameters. Model training component 120, in this regard, can train the model to set input parameters based on the interaction data. At some point in time (e.g., when a threshold amount of interaction data is received, a threshold time has passed, a developer indicates to freeze the model, etc.), model training component 120 can deploy the trained ML model to one or more applications (e.g., application(s) 140 or other instances of the application in a debug or release state) for use in performing subsequent inferences for selecting a screen brightness based on input parameter values.

Figure 5:
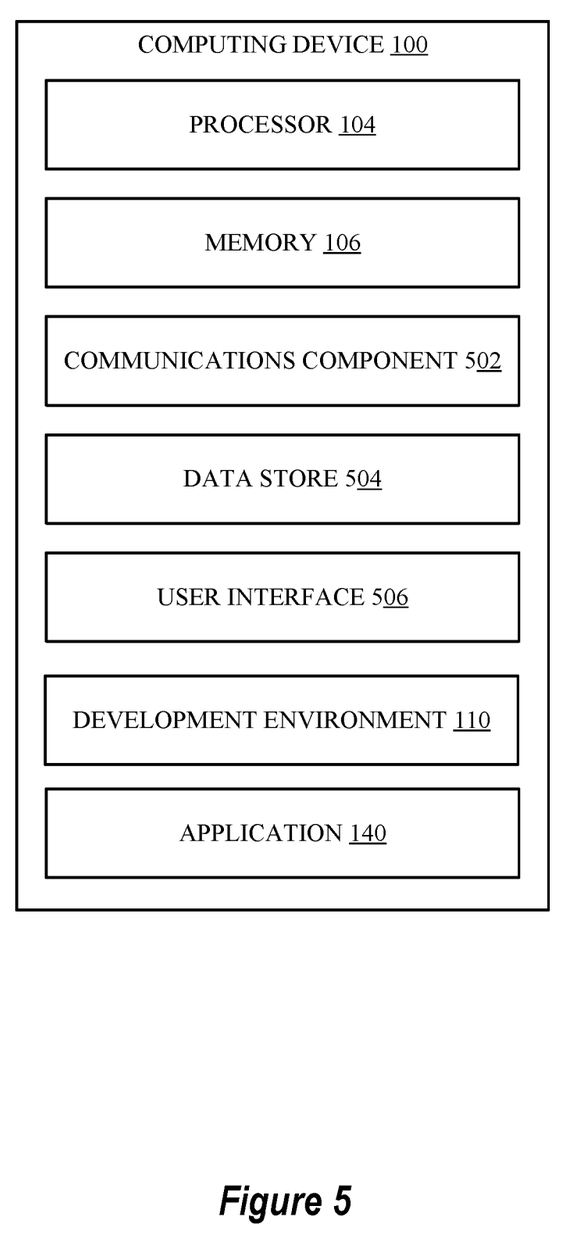
FIG. 5 is a schematic diagram of an example of a computing device for performing functions described herein.

FIG. 5 illustrates an example of computing device 100 including additional optional component details as those shown in FIG. 1. In one example, computing device 100 may include processor 104 for carrying out processing functions associated with one or more of components and functions described herein. Processor 104 can include a single or multiple set of processors or multi-core processors. Moreover, processor 104 can be implemented as an integrated processing system and/or a distributed processing system.

Computing device 100 may further include memory 106, such as for storing local versions of applications being executed by processor 104, related instructions, parameters, etc. Memory 106 can include a type of memory usable by a computer, such as random access memory (RAM), read only memory (ROM), tapes, magnetic discs, optical discs, volatile memory, non-volatile memory, and any combination thereof. Additionally, processor 104 and memory 106 may include and execute an operating system executing on processor 104, one or more applications, such as development environment 110, an instance of the application 140, and/or components thereof, display drivers, etc., as described herein, and/or other components of the computing device 100.

Further, computing device 100 may include a communications component 502 that provides for establishing and maintaining communications with one or more other devices, parties, entities, etc. utilizing hardware, software, and services as described herein. Communications component 502 may carry communications between components on computing device 100, as well as between computing device 100 and external devices, such as devices located across a communications network and/or devices serially or locally connected to computing device 100. For example, communications component 502 may include one or more buses, and may further include transmit chain components and receive chain components associated with a wireless or wired transmitter and receiver, respectively, operable for interfacing with external devices. For example, communications component 502 can carry communications between development environment 110 and an instance of the application 140 executing on another device (or the same device), etc.

Additionally, computing device 100 may include a data store 504, which can be any suitable combination of hardware and/or software, that provides for mass storage of information, databases, and programs employed in connection with examples described herein. For example, data store 504 may be or may include a data repository for applications and/or related parameters not currently being executed by processor 104. In addition, data store 504 may be a data repository for an operating system, application, such as development environment 110, application 140, and/or components thereof, etc. executing on the processor 104, and/or one or more other components of the computing device 100.

Computing device 100 may also include a user interface component 506 operable to receive inputs from a user of computing device 100 and further operable to generate outputs for presentation to the user (e.g., via display interface 116 to a display device). User interface component 506 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, any other mechanism capable of receiving an input from a user, or any combination thereof. Further, user interface component 506 may include one or more output devices, including but not limited to a display interface 116, a speaker, a haptic feedback mechanism, a printer, any other mechanism capable of presenting an output to a user, or any combination thereof.

Computing device 100 can also include a development environment 110 for developing an application with an ML model, and/or an instance of the application 140 along with a baseline version of the ML model, as described.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various examples described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computer-implemented method for training a model, comprising:
    deploying, on multiple separate devices, an instance of an application having a baseline version of a model for executing in a real-world context;
    receiving, by a development environment for developing the application and from each instance of the application, interaction data from the application based on using the model to perform inferences during execution of the instance of the application;
    training, by the development environment and based on the interaction data, the model to generate a trained version of the model for performing subsequent inferences during execution of the application; and
    generating, by the development environment, an updated instance of the application including the trained version of the model.

2. The computer-implemented method of claim 1, wherein the interaction data includes reward or punishment feedback for the inferences performed by the model during execution of the instance of the application.

3. The computer-implemented method of claim 2, wherein training the model comprises training using reinforcement learning based on the reward or punishment feedback.

4. The computer-implemented method of claim 1, further comprising deploying the updated instance of the application to at least a portion of the multiple separate devices or one or more other devices.

5. The computer-implemented method of claim 1, further comprising deploying the trained version of the model to the application deployed on the multiple separate devices.

6. The computer-implemented method of claim 1, wherein training the model includes updating the baseline version of the model in the application to the trained version of the model.

7. The computer-implemented method of claim 1, further comprising:
    instrumenting, by the development environment, existing code of the application with instructions to output data related to one or more inputs or outputs to generate an instrumented application;
    executing the instrumented application on the multiple separate devices or one or more other devices; and
    generating the baseline version of the model based at least in part on the data related to one or more inputs or outputs that is output by one or more instances of the instrumented application.

8. The computer-implemented method of claim 7, wherein generating the baseline version of the model is based at least in part on detecting, by the development environment, instrumenting of the existing code.

9. The computer-implemented method of claim 1, further comprising generating the baseline version of the model based at least in part on specifying randomized inputs and associated outputs.

10. The computer-implemented method of claim 9, wherein generating the baseline version of the model is based at least in part on detecting, by the development environment, insertion of one or more machine learning-based features in the application.

11. A computing device for training a model, comprising:
    a memory storing one or more parameters or instructions for developing an application; and
    at least one processor coupled to the memory, wherein the at least one processor is configured to:
        deploy, on multiple separate devices, an instance of an application having a baseline version of a model for executing in a real-world context;
        receive, by a development environment for developing the application and from each instance of the application, interaction data from the application based on using the model to perform inferences during execution of the instance of the application;
        train, by the development environment and based on the interaction data, the model to generate a trained version of the model for performing subsequent inferences during execution of the application; and
        generate, by the development environment, an updated instance of the application including the trained version of the model.

12. The computing device of claim 11, wherein the interaction data includes reward or punishment feedback for the inferences performed by the model during execution of the instance of the application.

13. The computing device of claim 12, wherein the at least one processor is configured to train the model using reinforcement learning based on the reward or punishment feedback.

14. The computing device of claim 11, wherein the at least one processor is further configured to deploy the updated instance of the application to at least a portion of the multiple separate devices or one or more other devices.

15. The computing device of claim 11, wherein the at least one processor is further configured to deploy the trained version of the model to the application deployed on the multiple separate devices.

16. The computing device of claim 11, wherein the at least one processor is configured to train the model at least in part by updating the baseline version of the model in the application to the trained version of the model.

17. The computing device of claim 11, wherein the at least one processor is further configured to:
  instrument, by the development environment, existing code of the application with instructions to output data related to one or more inputs or outputs to generate an instrumented application;
  execute the instrumented application on the multiple separate devices or one or more other devices; and
  generate the baseline version of the model based at least in part on the data related to one or more inputs or outputs that is output by one or more instances of the instrumented application.

18. The computing device of claim 11, wherein the at least one processor is further configured to generate the baseline version of the model based at least in part on specifying randomized inputs and associated outputs.

19. A computer-readable medium, comprising code executable by one or more processors for training a model, the code comprising code for:
  deploying, on multiple separate devices, an instance of an application having a baseline version of a model for executing in a real-world context;
  receiving, by a development environment for developing the application and from each instance of the application, interaction data from the application based on using the model to perform inferences during execution of the instance of the application;
  training, by the development environment and based on the interaction data, the model to generate a trained version of the model for performing subsequent inferences during execution of the application; and
  generating, by the development environment, an updated instance of the application including the trained version of the model.

20. The computer-readable medium of claim 19, wherein the interaction data includes reward or punishment feedback for the inferences performed by the model during execution of the instance of the application.

* * * * *